Aug. 16, 1949.          R. W. LUCE          2,478,972
                    COWL FASTENER STUD
                    Filed Feb. 29, 1944
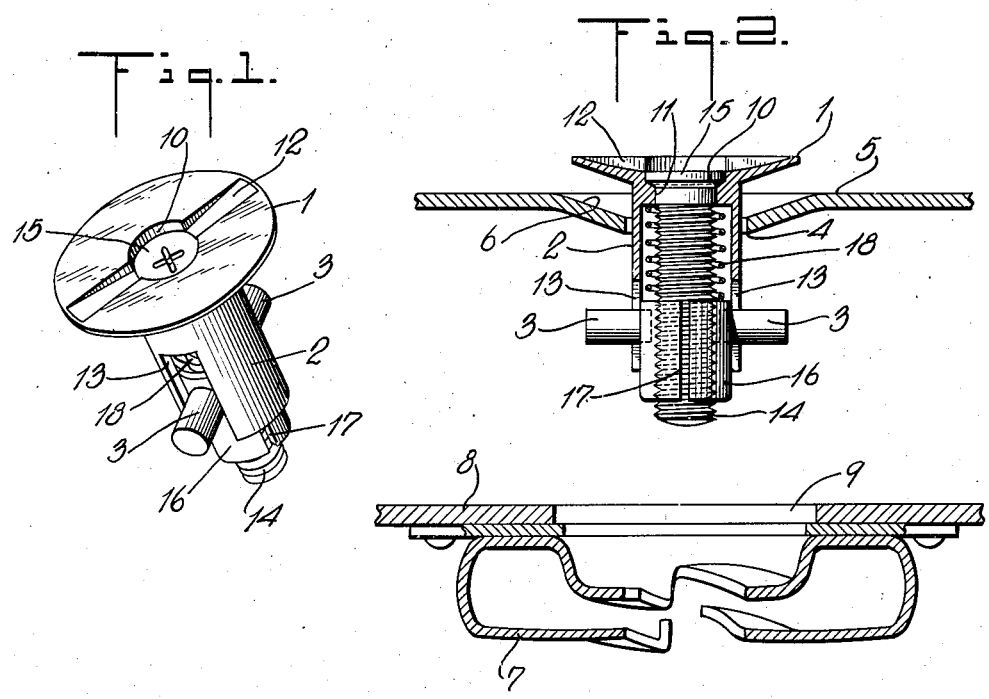
INVENTOR
Richard W. Luce
BY
George T. Gill
ATTORNEY Patented Aug. 16, 1949

2,478,972

UNITED STATES PATENT OFFICE 2,478,972

COWL FASTENER STUD

Richard W. Luce, Southport, Conn.

Application February 29, 1944, Serial No. 524,375

1 Claim. (Cl. 24—221)

The invention herein disclosed relates to a rotary operative fastener of the kind that is readily releasable by a partial turn of one of the engaging elements and which, particularly in the aircraft industry, is commonly termed a cowl fastener. More particularly, this invention relates to a stud for such fasteners.

Fasteners of the kind to which this invention relates are commonly used to secure cover plates which when removed uncover an opening through which access may be had to mechanism covered thereby. In general, such fasteners consist of two interengaging parts, a socket member that is rigidly secured to one of the plates or members to be secured together and a stud which extends through an opening in the cover plate and is provided with a radial arm for effecting fastening engagement with the socket member. The stud is provided with a slotted head through which it may be rotated to effect engagement or release from the socket member. As heretofore constructed the distance from the head of the stud to the radial arm was fixed. Each size plate required a separate stud adapted to that size plate and a number of different sizes of studs have, heretofore, been required as such fasteners are used to secure plates of different sizes.

The principal object of this invention is to provide a stud for rotary operative fasteners of the kind mentioned that is universal in its application in that it is suitable for many different plate thickness and adaptable for use with many of the different forms of socket elements now in use. Another object of the invention is to provide such a stud that is readily and easily adjusted to different plate thicknesses. A further object of the invention is to provide a stud for such fasteners that is readily and easily assembled in a cover plate.

The foregoing objects and certain advantages that will hereinafter appear are realized in the embodiments of the invention illustrated by way of example in the accompanying drawings and described in detail below.

The drawings include:

Fig. 1 which is an isometric view of a stud embodying the invention;

Fig. 2 which is a longitudinal section of the same; and

Fig. 3 which is a sectional elevation of a socket for the stud.

The stud illustrated in Figs. 1 and 2 of the drawings comprises, in general, a head 1, a shank 2 and radial arms 3 extending in diametrically opposite directions from the stud. Commonly, the stud is assembled in an opening 4 in a removable cover plate 5 with the head on one side of the opening and the radial arms on the other side of the opening. The plate 5 is preferably countersunk as at 6 so that in the assembled and fastened position, the head is flush with the surface of the plate. A socket member 7 is rigidly secured, as by rivets, to another plate 8 axially aligned with an opening 9 therethrough. The socket member receives and engages the radial arms 3 in fastening engagement when the stud is entered in the socket and rotated through a partial revolution. The particular socket illustrated is the one shown in my copending application Serial No. 446,849, filed June 13, 1942.

The head of the stud has a recess 10 formed therein centrally thereof and in alignment with an opening 11 extending into shank 2. A diametrical slot 12 is provided in the head and it is preferably arcuate in accordance with the edge of a coin. In this way, a coin may be used as a tool for rotating the stud.

The shank 2 which is integral with the head is hollow. At diametrically opposite sides there are longitudinally extending slots 13 extending through the wall of the shank. These slots extend from the free end of the shank to a point intermediate the end of the shank and the head. These slots, as will hereinafter appear, determine the limits of the adjustment of the distance of the arms 3 from the head 1, and so the limits of different plate thickness that may be accommodated.

Within the shank 2, there is, extending axially thereof, a machine screw 14. The head 15 of the machine screw 14 is received in the recess 10 of the head 1 of the stud and the machine screw extends through the opening 11 into the shank. The screw 14 is longer than the shank and extends beyond the end thereof.

The radial arms 3 are secured in and carried by an internally threaded sleeve 16 which is slidable within the shank 2. This sleeve receives the machine screw 14 in threaded engagement and the arms 3 extend through the slots 13 in the wall of the shank. Engagement of the arms 3 with the edges of the slots 13 secure the sleeve 16 against relative rotation with respect to the shank 2. In consequence, with the head 15 of the screw 14 seated in the recess 10 of the head 1, rotation of the screw will cause the sleeve 16, and the arms 3, to move closer to or farther from the head 1. The pitch of the thread of the screw 14 is preferably such that the sleeve may be adjusted with respect to the head by very small increments throughout its limits of adjustment as determined by the slots 13. The sleeve 16 is preferably slotted longitudinally as at 17 and compressed circumferentially. In this way a frictional engagement is obtained between the thread of the screw and the thread of the sleeve.

Within the shank 2, there is a spring 18. This spring acts between the base 11' of the hollow shank and the adjacent edge of the sleeve 16. The spring serves to maintain the head 15 of the screw 14 seated in its recess, and, in consequence, the arms 3 in their adjusted distance from the head 1.

In assembling the stud in the cover plate, the stud is disassembled and the shank 2 inserted through the opening 4. The stud is then assembled and adjusted for the particular size of the plates 5 and 8.

It will be obvious that various changes may be made by those skilled in the art in the embodiment of the invention illustrated in the drawing and described in detail above within the principle and scope of the invention as expressed in the appended claim.

I claim:

A stud for a rotary operative fastener of the kind described which stud comprises in combination a head having a recess therein, a hollow shank having an axially extending slot therein, a threaded sleeve within the shank having a radial arm extending through the slot, a threaded element having a head in the recess in the head of the stud and extending into the sleeve in threaded engagement therewith, and resilient means acting between the shank and the sleeve.

RICHARD W. LUCE.

REFERENCES CITED

The following references are of record in the file of this patent:

UNITED STATES PATENTS

| Number | Name | Date |
| --- | --- | --- |
| 193,272 | Nichols | July 17, 1877 |
| 2,152,231 | Yaneson | Mar. 28, 1939 |
| 2,329,909 | Johnson | Sept. 21, 1943 |
| 2,374,679 | Hallock | May 1, 1945 |

FOREIGN PATENTS

| Number | Country | Date |
| --- | --- | --- |
| 462,482 | Great Britain | Mar. 10, 1937 |
| 542,028 | Great Britain | Dec. 23, 1941 |